United States Patent [19]

Kikuchi

[11] Patent Number: 4,672,153

[45] Date of Patent: Jun. 9, 1987

[54] TOUCH PANEL

[75] Inventor: Hiroshi Kikuchi, Furukawa, Japan

[73] Assignee: Alps Electric Co., Ltd., Japan

[21] Appl. No.: 819,914

[22] Filed: Jan. 16, 1986

[30] Foreign Application Priority Data

Jan. 16, 1985 [JP] Japan .............................. 60-2908[U]

[51] Int. Cl.$^4$ ............................................ G08C 21/00
[52] U.S. Cl. ........................................ 178/18; 29/622; 156/313
[58] Field of Search .............................. 178/18, 19, 20; 29/592 R, 622, 830, 831; 340/719; 156/300, 313

[56] References Cited

U.S. PATENT DOCUMENTS 3,735,023  5/1973  Hurst et al. ........................ 178/18
4,131,991  1/1979  Riniker ............................... 29/622

Primary Examiner—Stafford D. Schreyer
Attorney, Agent, or Firm—Guy W. Shoup

[57] ABSTRACT

A light-transmissive touch panel is disclosed which comprises a substrate, upper and lower electrode sheets, and a transparent double adhesive tape at least between the lower electrode sheet and the substrate so as to be superposed all over their surfaces, the transparent double adhesive tape having a refractive index proximate to those of the lower sheet of the substrate.

3 Claims, 6 Drawing Figures

TOUCH PANEL

BACKGROUND OF THE INVENTION

Field of the Invention

This invention relates to a touch panel disposed in front of the screen of a CRT, or the like, and useful for detecting the coordinate of a position against which touch is made with such as a finger or pen.

Description of the Prior art

The coordinate inputting device with a light-transmissive touch panel is provided in front of the screen of CRT, LCK (Liquid crystal display), or the like, and one can perform various operations by touching against the surface of the touch panel while viewing the screen.

FIG. 4 is a cross-sectional view of a first prior art example of touch panel, and FIGS. 5 and 6 are similar views of second and third prior art examples with a display sheet and a shield plate.

In FIG. 4 of the first prior art example, reference characters designate as follows: 1, an upper electrode sheet having a refractive index of about 1.5 and consisting of a transparent film and an upper electrode of ITO formed on it; 2, an lower electrode sheet having a refractive index of about 1.5 and consisting of a transparent film and an lower electrode of ITO formed on it; 3, dot spacers of insulating matrial formed on the lower electrode sheet 2; and 4, a transparent substrate of synthetic resin or glass and having a refractive index of about 1.5. The upper electrode sheet 1 and the lower electrode sheet 2 are adhered together with a double adhesive tape 5 needing no transparency placed between them, the tape being provided with a light-passing opening positionally correspondent to the CRT screen field. The lower electrode sheet 2 and the substrate 4 are similarly adhered together. Thus a transparent, laminated touch panel is constructed. The thus-obtained touch panel is mounted on the screen of CRT or the like. If one touch with a finger or pen against the upper electrode sheet 1 while viewing the screen, then the coordinate representing a position brought into contact between the opposed upper and lower electrodes is detected. The touch panel however has air layer remaining between the upper electrode sheet 1 and the lower electrode sheet 2 and between the lower electrode sheet 2 and the substrate 4. The remaining air layers gives the defect that when one touches against the upper electrode sheet 1, it is caused to so readily be flexed (the stroke associated with the flexion: about 0.4 to 0.6 mm), that is too soft a touch with bad operational feeling. Another defect of the touch panel is that owing to the great difference in refractive index of the remaining air layers (refractive index: about 1.5) from the substrate 4 and the upper and lower electrode sheets 1 and 2, attenuation of light arises at the interfaces, and as the result the CRT screen looks blurred when viewed from the front of the upper electrode sheet 1.

In FIG. 5 showing the second prior art example, a reference character 6 designates an indication sheet of polyester, polycarbonate, or the like, and with a refractive index of about 1.5; and 7, a shield plate of 1.5 in refractive index and consisting of a transparent film and a ITO, or the like, formed on it. The shield plate 7 serves for removing static electricity generating on the surface of CRT. The indication sheet 6 and the upper electrode sheet 1 are adhered together through the intermediation of a tape 5 having a light-passing opening positionally corresponding to the screen field. Similar interadhesion through a tape is made between the shield plate 7 and the substrate 4. The other respects are same as in FIG. 4. The third prior art example shown in FIG. 6 is provided with a shield 7 between the substrate 4 and the lower electrode sheet 2, and interadhesion through a tape 5 with a light-passing opening positionally corresponding to the screen field is made between the lower electrode sheet 2 and the shield plate 7 and between the shield plate 7 and the substrate 4. The other respects are the same as in the second prior art example shown in FIG. 5.

The prior art examples illustratied in FIGS. 5 and 6, respectively, have similar defects to those of the FIG. 4 example.

SUMMARY OF THE INVENTION

It is the principal object of the invention to remove defects involving the prior arts and to provide a transparent touch panel with good operational feeling and minimized light attenuation.

BRIEF DESCRIPTION OF THE DRAWINGS

FIG. 1 is a cross-sectional view of the first embodiment;

FIGS. 2 and 3 are cross-sectional views of the second and third embodiments provided additionally with an indication sheet and a shield plate;

DETAILED DESCRIPTION OF THE INVENTION

For achieving the above-mentioned object, according to the invention, there is provided a double adhesive tape having a refractive index approximate to those of the lower electrode sheet and the substrate at least between the lower electrode sheet and the substrate and at least all over the surfaces of the operational part in order to improve the sense of operational touch and to reduce light attenuation.

Figure 1:
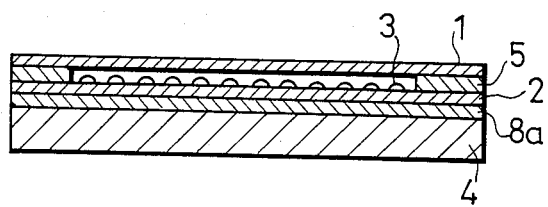
FIGS. 1 through 3 show touch panels embodying the invention. Particularly.
Figure 2:
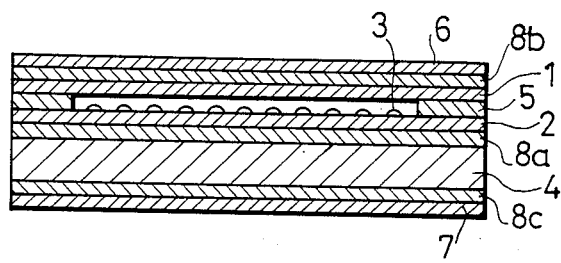
Figure 3:
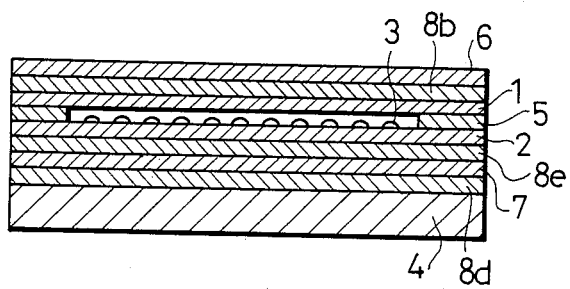
Figure 4:
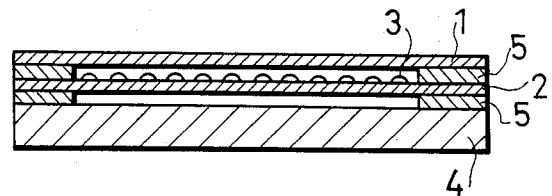
FIG. 4 is a cross-sectional view of a first prior art example of touch panel.

FIG. 1 through 3 show touch panels embodying the invention: FIG. 1 is a cross-sectional view of the first embodiment, and FIGS. 2 and 3 are cross-sectional view of the second and third embodiments provided additionally with an indication sheet and a shield plate. In these drawings, identical elements and layers to those shown in FIGS. 4 through 6 are indicated at the same reference numerals as those in FIGS. 4 through 6, and so the description of them are omitted.

In FIG. 1 showing the first embodiment, a reference character 8a designates a transparent, double adhesive tape having a refractive index of about 1.5 approximate to those of the lower electrode sheet 2 and the substrate 4, and intermediating the interadhesion of both all over the surfaces of them. The other respects are the same as the prior art example shown in FIG. 1. In the first embodiment of the above-stated invention, there is no air layer, though the prior art involves an air layer, between the lower electrode sheet 2 and the substrate 4, so that when one touches against the upper electrode sheet 1, it responses with a small flexure (stroke caused on touch: rough range of 0.1 mm to 0.15 mm) and accordingly hard touch feeling or improved sense of operational touch compared with that of the prior arts. In virtue of the refractive index of about 1.5 of the double adhesive tape 8a approximate to those of the substrate 4 and the lower electrode sheet 2, a small degree of attenuation is induced at interfaces between the double adhesive tape 8a and the substrate 4 and between the tape and the lower electrode sheet 2, which enables to clearly view CRT screen from the front of the upper electrode sheet 1, compared with those of the prior arts. Experimental comparison of light transmission factor between the touch panels illustrated in FIGS. 1 and 4 gave a superior result of about 77 % of the invention touch panel to an about 60 % of the prior art one.

Further, in the above-stated embodiment of the invention, the double adhesion tape 8a is not always superpose all over the surfaces of the lower electrode sheet 2 and the substrate 4, and it may be adequate to superpose all over the corresponding region to touch control part, and other necessary operational parts for operating the touch panel on the screen as of CRT, or the like, viewed from the front of the upper electrode sheet.

Figure 5:
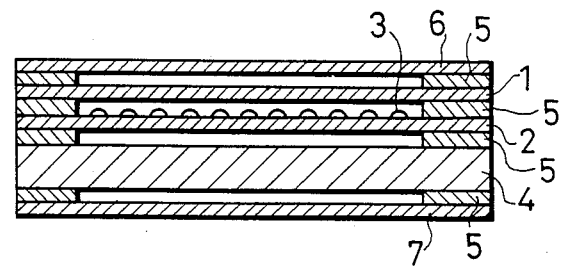
FIGS. 5 and 6 are similar views of second and third prior art examples with a display sheet and a shield plate.
Figure 6:
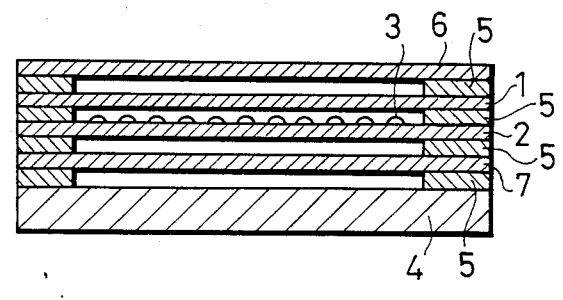

The second embodiment of the invention shown in FIG. 2 is correspondent to the prior art example illustrated in FIG. 5 except for the different respects that there are provided a transparent double adhesive tape, 8b instead of the conventional double adhesive tape 5, between the indication sheet 6 and the upper electrode sheet 1 to be superposed all over their surfaces, the transparent double adhesive tapes 8b having a refractive index of about 1.5 approximate to those of both sheets 6 and 1, a transparent double adhesive tape 8a instead of the conventional double adhesive tape 5, between the lower electrode sheet 2 and the substrate 4 to be superposed all over their surfaces, the transparent double adhesive tapes 8a having a refractive index of about 1.5 approximate to those of both elements, and a transparent double adhesive tapes 8c, instead of the transparent double adhesive tape 5, between the substrate 4 and the shield plate 7 to be superposed all over their surfaces, the transparent double adhesive tapes 8c having a refractive index of about 1.5 approximate to those of both elements. Further, the double adhesive tapes 8a, 8b and 8c may be of the same material and have approximate refractive indexes.

The embodiment of FIG. 2 is distinguishable from the prior art example of FIG. 5, in that there is no the air layer, though the prior art involves air layer, between indication sheet 6 and the upper electrode sheet 1 so that when one touches against the indication plate 6, the touch panel responses with a small flexure, and accordingly hard touch feeling or improved sense of operational touch, compared with that in the prior arts. In virtue of the refractive index of about 1.5 of the double adhesive tapes 8a, 8b and 8c approximate to those of indication sheet 6, upper and lower electrrode sheets 1, 2, substrate 4 and shield plate 7, a reduced attenuation is induced at interfaces between double adhesive tape 8b, and indication plate 6 and upper electrode sheet 1, respectively, between tape 8a, and lower electrode sheet 2 and substrate 4, respectively, and between tape 8c, and the substrate 4 and shield plate 7, compared with those of the prior arts.

The third embodiment of the invention shown in FIG. 3 is correspondent to the prior art example illustrated in FIG. 6 except for the distinct respects that there are provided a transparent double adhesive tapes 8b, instead of the conventional double adhesive tape 5, between the indication sheet 6 and the upper electrode sheet 1, to be superposed all over their surfaces, the transparent double adhesive tape 8b having a refractive index of about 1.5 approximate to those of both elements, a transparent double adhesive tape 8d, instead of the conventional double adhesive tape 5, between the conventional substrate 4 and the shield plate 7 to be superposed all over their surfaces, the transparent double adhesive tapes 8d having a refractive index of about 1.5 approximate to those of both elements, and a transparent double adhesive tapes 8e, instead of the conventional double adhesive tape 5, between the display sheet 6 and the upper electrode sheet 1 superposed all over their surfaces, the transparent double adhesive tapes 8e having a refractive index of about 1.5 approximate to those of both elements. Further, the double adhesive tapes 8b, 8d and 8e, may be of the same material and have approximate refractive indexes.

The third embodiment of FIG. 3 is distinguishable from the prior art example shown in FIG. 6 in the respects that there are no air layer, though the prior art involves air layer, between the indication sheet 6 and the upper electrode sheet 1, that when one touches against the indication plate 6, it is resistant to be flexed, accompanied with hard touch feeling or improved the sense of operational touch compared with that of the prior art. In virtue of the double adhesive tapes 8b, 8d and 8e having refractive index of about 1.5 approximate to those of indication plate 6, upper and lower electrode sheets 1 and 2, shield plate 7 and substrate 4 used for removing the remaining air layers in the prior art example shown in FIG. 6, reduced attenuation is induced at interfaces between double adhesive tape 8a and indication sheet 6 and upper electrode sheet 1, respectively, and between tape 8e, and lower electrode sheet 2 and shield plate 7, respectively, and between double adhesive tape 8d, and shield plate 7 and substate 4, respectively, compared with those of the prior art example shown in FIG. 6.

As above-described, according to the invention, there is provided a transparent, double adhesive tape between the lower electrode sheet and the substrate to be superposed all over their surfaces, the adhesive tape having a refractive index approximate to those of them, so that no air layer may remains between them, with the result of small flexture on touch, and thus improved operational feeling compared with those of the prior arts, and reduced light attenuation at interfaces between the lower electrode sheet and the double adhesive tape and between the substrate and the double adhesive tape, which takes effect of making view of the CRT screen from the front of the upper electrode sheet clear compared with the prior art touch panel.

What is claimed is:

1. In a light transmissive touch panel comprising in lamination an upper electrode sheet, a lower electrode sheet, and a substrate, further provision of a transparent, double adhesive tape at least between said lower electrode sheet and said substrate to be superposed at least all over the operational-part surfaces of said sheet and said substrate, said transparent, double adhesive tape having a refractive index approximate to the indexes of said lower electrode sheet and said substrate.

2. A touch panel defined in claim 1 wherein said transparent, double adhesive tape is provided between said lower electrode sheet and said substrate so that no air layer remains therebetween.

3. A touch panel defined in claim 1 wherein a transparent indication sheet overlies said upper electrode sheet through the intermediation of a transparent, double adhesive tape so that no air layer remains between said transparent indication sheet and said upper electrode sheet, and a transparent shield plate is provided on the underside of said substrate through the intermediation of another transparent, double adhesisve tape so that no air layer remains between said substrate and said transparent shield plate.

* * * * *